United States Patent
Iwashita et al.

(10) Patent No.: US 8,924,004 B2
(45) Date of Patent: Dec. 30, 2014

(54) NUMERICAL CONTROLLER FOR MAKING POSITIONING COMPLETION CHECK

(75) Inventors: Yasusuke Iwashita, Minamitsuru-gun (JP); Junichi Tezuka, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 658 days.

(21) Appl. No.: 13/248,383

(22) Filed: Sep. 29, 2011

(65) Prior Publication Data

US 2012/0203374 A1 Aug. 9, 2012

(30) Foreign Application Priority Data

Feb. 8, 2011 (JP) ................................ 2011-025052

(51) Int. Cl.
*G05B 19/19* (2006.01)
*G05B 19/402* (2006.01)

(52) U.S. Cl.
CPC ................... *G05B 19/402* (2013.01)
USPC .......................................... 700/186; 700/159

(58) Field of Classification Search
CPC .. G05B 19/401; G05B 19/402; G05B 19/404; G05B 19/408; G05B 19/4093; G05B 19/4097; G05B 19/41; G05B 19/414; G05B 19/182
USPC ................. 700/159, 160, 186, 187, 192, 193
See application file for complete search history.

(56) References Cited

U.S. PATENT DOCUMENTS

| | | | | |
|---|---|---|---|---|
| 4,564,912 A | * | 1/1986 | Schwefel | 700/190 |
| 4,949,025 A | | 8/1990 | Iwagaya et al. | |
| 5,329,457 A | * | 7/1994 | Hemmerle et al. | 700/193 |
| 5,373,222 A | * | 12/1994 | Hemmerle et al. | 318/572 |
| 5,713,253 A | * | 2/1998 | Date et al. | 700/160 |
| 5,730,036 A | * | 3/1998 | Ozaki et al. | 82/1.3 |
| 7,433,754 B2 | | 10/2008 | Otsuki et al. | |
| 7,969,111 B2 | * | 6/2011 | Otsuki et al. | 700/186 |
| 8,042,436 B2 | * | 10/2011 | Muraki et al. | 82/118 |
| 2007/0179661 A1 | * | 8/2007 | Onozuka et al. | 700/173 |
| 2007/0258777 A1 | * | 11/2007 | Gunther et al. | 407/83 |
| 2009/0140684 A1 | * | 6/2009 | Otsuki et al. | 318/572 |

FOREIGN PATENT DOCUMENTS

| | | |
|---|---|---|
| DE | 3883471 T2 | 12/1993 |
| JP | 63-74551 A | 4/1988 |
| JP | 5-88725 | 4/1993 |
| JP | 6-89109 | 3/1994 |
| JP | 3045603 B2 | 5/2000 |
| JP | 2000-231412 | 8/2000 |

* cited by examiner

*Primary Examiner* — Charles Kasenge
(74) *Attorney, Agent, or Firm* — Drinker Biddle & Reath LLP

(57) ABSTRACT

A numerical controller calculates the distance (rotation radius) between the rotation center axis of a rotary axis and a control target point using the machine conditions (including the axis structure and tool length) of a machine tool having a rotary axis and the coordinate values of the respective axes of the machine tool. Then, the preset positioning completion widths of the respective axes are compensated by the calculated rotation radius and a positioning completion check of the rotary axis is carried out using the compensated positioning completion widths.

5 Claims, 5 Drawing Sheets

NUMERICAL CONTROLLER FOR MAKING POSITIONING COMPLETION CHECK

RELATED APPLICATION DATA

This application claims priority under 35 U.S.C. §119 and/or §365 to Japanese Application No. 2011-025052 filed Feb. 8, 2011, the entire contents of which is incorporated herein by reference.

BACKGROUND OF THE INVENTION

1. Field of the Invention

The present invention relates to a numerical controller that controls a machine tool and, more particularly, to a numerical controller that carries out a positioning completion check of a rotary axis.

2. Description of the Related Art

A servo motor that drives the respective axes of a machine tool is driven by a controller such as a numerical controller so that its position and speed is controlled. Since it is difficult to drive or stop the servo rapidly, acceleration/deceleration control is generally performed for a movement command. That is, the movement command is gradually increased during acceleration or the movement command is gradually reduced during deceleration.

In order to check if the servo motor reaches an instructed position in controlling the driving of the servo motor by this type of acceleration/deceleration, the positional deviation to be stored in the error register of the servo circuit is read to determine (carry out a positioning completion check) whether the read positional deviation falls within the positioning completion width in a conventional method after movement command X becomes 0 and the acceleration/deceleration control is completed and movement command Y from a acceleration/deceleration control unit becomes 0. And if the positional deviation falls within the positioning completion width, it is determined that the servo motor reaches an instructed position, that is, positioning has been completed.

Machine tools generally check (carry out a positioning completion check) if the tool position reaches an instructed position during switching from fast forward operation to cutting forward operation. In the positioning completion check, whether the tool position reaches an instructed position is determined by the convergence of the positional deviations of servo axes to a preset level or less.

Japanese Patent Application Laid-Open No. 6-89109 discloses a method of arbitrarily setting a positioning completion width for each machining block as a prior art concerning the positioning completion check. Japanese Patent Application Laid-Open No. 2000-231412 discloses a method of making the positioning completion check using a positional deviation combined depending on the movement direction of each axis. In addition, Japanese Patent Application Laid-Open No. 5-88725 discloses a method of selectively using a plurality of positioning completion widths according to the type of an instruction.

In a machine tool including a rotary axis in addition to a linear axis, the operation of the machine tool is produced by the combination of the operation of the rotary axis and the linear axis. The amount of movement of the tool position with respect to the rotation angle of the rotary axis is proportional to the distance (that is, the rotation radius) between the center axis of rotation and the tool position. Accordingly, in case where the positioning completion width of the rotary axis is given by an angle, the width (check width) converted into the amount of movement of the tool tip along the movement path changes in proportion to the distance (rotation radius) between the center axis of the rotation and the tool tip, even if the positioning completion width (angle) is the same (see FIG. 1).

The above positioning completion check carried out, for example, during switching from fast forward operation to cutting forward operation ensures the machining precision at the starting of machining and at the end of machining. This machining precision originally ensures the precision on the workpiece, so it should be given as a linear dimension on the workpiece. If the positioning completion check of the rotary axis of a machine tool is carried out by an angle, the check width at a tool center point (or an amount of movement of the tool center point along the movement path) changes depending on (or in proportion to) the rotation radius. When the rotation radius is larger even if the angle given as the positioning completion width is the same, the check width becomes larger and whether an instructed position has been reached cannot be determined precisely.

SUMMARY OF THE INVENTION

The object of the present invention is to provide a numerical controller that can carry out a positioning completion check at the tool center point at a desired precision on the workpiece by changing the positioning completion width of the rotary axis depending on the rotation radius.

The numerical controller according to the present invention controls a machine tool having at least one rotary axis. The numerical controller includes a machine condition setting unit that sets machine conditions including an axis structure and a tool length of the machine tool, a coordinate value obtaining unit that obtains instructed coordinate values or actual coordinate values of respective axes at a certain time, a rotation radius calculating unit that calculates a rotation radius (that is, a distance from a rotation center axis of the rotary axis to a control target point) using the machine conditions obtained from the machine condition setting unit and the instructed coordinate values or the actual coordinate values of the respective axes output from the coordinate value obtaining unit, a positioning completion width setting unit that sets positioning completion widths of the respective axes, and a second positioning completion width calculating unit that calculates a second positioning completion width using the rotation radius output from the rotation radius calculating unit and the positioning completion width of the rotary axis obtained from the positioning completion width setting unit, in which a positioning completion check of the rotary axis is carried out using the second positioning completion width output from the second positioning completion width calculating unit.

The second positioning completion width calculating unit may calculate the second positioning completion width in a manner such that the second positioning completion width is inversely proportional to the rotation radius.

The positioning completion width setting unit may set the positioning completion width of the rotary axis as a length along a movement path of the control target point.

The second positioning completion width calculating unit may set an upper limit value or a lower limit value of the second positioning completion width.

The second positioning completion width calculating unit may set an upper limit value or a lower limit value of the rotation radius used for calculation.

The present invention can provide a numerical controller that may carry out a positioning completion check at the tool center point at a desired precision on the workpiece by changing the positioning completion width of the rotary axis depending on the rotation radius, so that the positioning completion width of the rotary axis does not need to be set to a small value so as to fit in with the maximum radius and the time required for a positioning completion check can be set to the minimum value while ensuring the precision on the workpiece and the cycle time can be reduced.

BRIEF DESCRIPTION OF THE DRAWINGS

These and other objects and features of the present invention will become apparent from the following description of embodiments with reference to the accompanying drawings, in which.

DETAILED DESCRIPTION OF THE PREFERRED EMBODIMENTS

Figure 1:
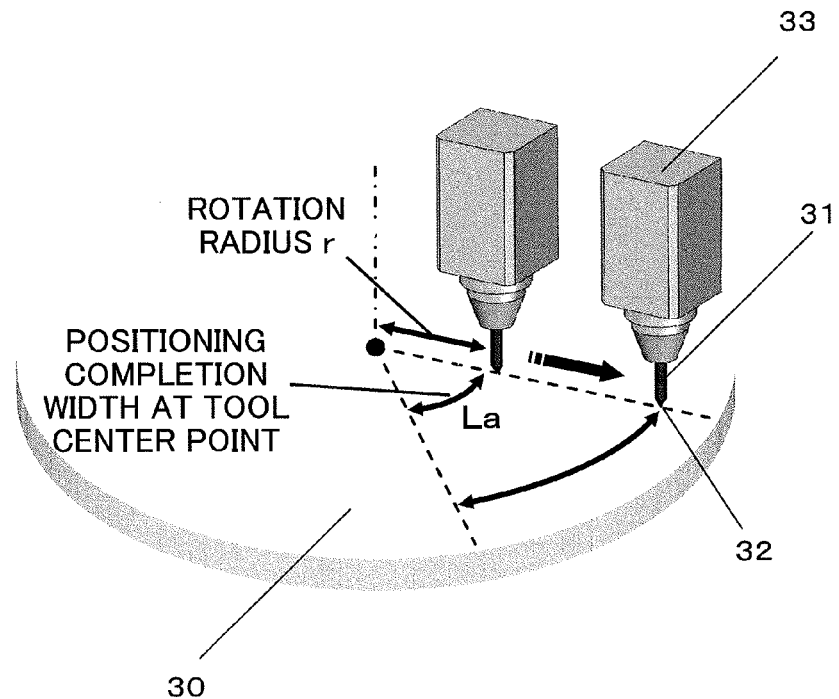
FIG. 1 shows the calculation of a positioning completion width of a rotary axis carried out by a numerical controller according to the present invention.

The calculation of a positioning completion width of a rotary axis carried out by the numerical controller according to the present invention will be described with reference to FIG. 1.

When the positioning completion width of the rotary axis is given as a certain angle, the distance (distance along the arc path of movement of a tool center point 32) between the position within which the tool center point 32 is determined to reach an instructed position and the instructed point depends on the distance (that is, a rotation radius r) between the rotation center of the rotary axis and the tool center point 32.

To keep a positioning completion width La of the tool center point 32 (that is, a distance along the arc path of movement of the tool center point 32) constant regardless of the rotation radius r, the angle used for a positioning completion check of the rotary axis (that is, an angle giving the positioning completion width of the rotary axis) needs to be changed in inverse proportion to the rotation radius r.

When the rotation radius is r and the length (distance along the arc path of movement of the tool center point 32) of the arc at the tool center point is La, an angle θ used for a positioning completion check of the rotary axis is obtained by the expression (1) below.

$$\theta = La/r \quad (1)$$

When the angle θ is actually used for a positioning completion check of the rotary axis, the positioning completion width La (distance along the arc path of movement of the tool center point 32) can be limited within a practical range by clamping the calculation result of the positioning completion width La with the upper limit and lower limit or by clamping the rotation radius r used for calculation with the upper limit and lower limit. The angle θ in the expression (1) above is referred to below as a second positioning completion width.

Next, the method of making a positioning completion check of the rotary axis of a 5-axis machine tool of the tool head rotation type carried out by the numerical controller according to the present invention will be described below with reference to FIG. 2.

Figure 2:
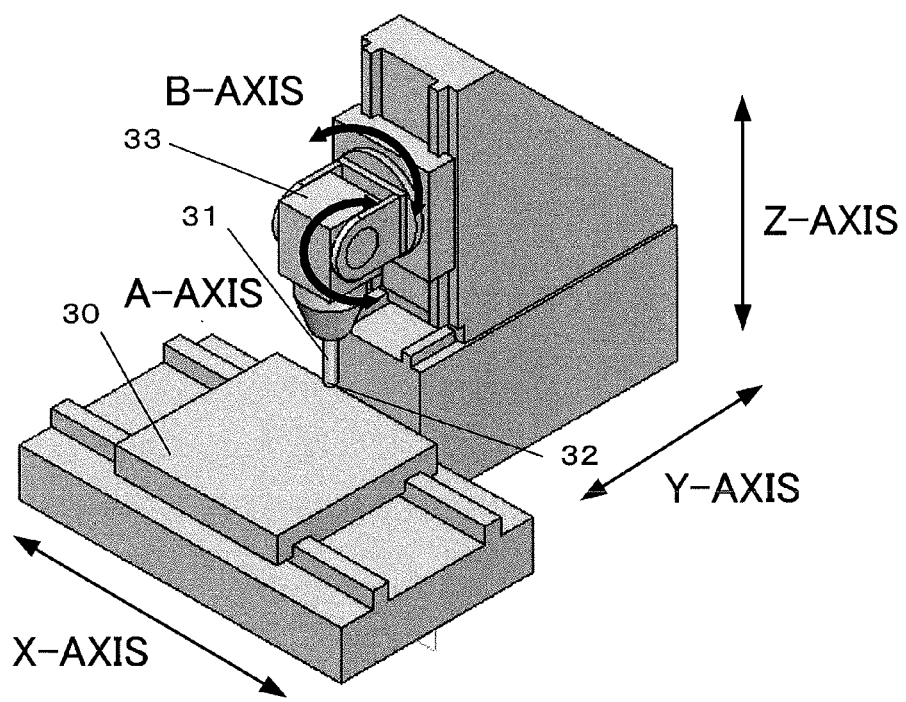
FIG. 2 shows a method of a positioning completion check for a rotary axis of a 5-axis machine tool of the tool head rotation type carried out by the numerical controller according to the present invention.

In the 5-axis machine tool of the tool head rotation type shown in FIG. 2, the X-, Y-, and Z-axes are linear axes and the A- and B-axes are rotary axes. The numerical controller that controls the 5-axis machine tool has the function of performing a positioning completion check for each of the X-, Y-, Z-, A-, and B-axes. The coordinate values of these five axes at time t are assumed to be x(t), y(t), z(t), a(t), and b(t), respectively. The workpiece to be machined is placed on the table. The tool center point moves relative to the workpiece by the X-, Y-, and Z-linear axes and the A- and B-rotary axes.

In the 5-axis machine tool of the tool head rotation type shown in FIG. 2, the A- and B-rotary axes orthogonally intersect to each other at an intersection point M. When the rotation radius of the A-axis is Ra and the distance between the intersection point M and the tool center point 32 is L, the expression (2) below holds.

$$Ra = L \quad (2)$$

Next, when the rotation radius of the B-axis is assumed to be Rb, Rb depends on the coordinate value a(t) of the A-axis and the expression (3) below holds.

$$Rb = L \times \cos(a(t)) = Ra \times \cos(a(t)) \quad (3)$$

However, the coordinate value of the A-axis is assumed to be 0 when a tool 31 faces vertically downward, as shown in FIG. 2.

As described above, the rotation radius of the tool center point with respect to the rotary axes can be calculated on the basis of positional relationship between respective driving axes, the length of the tool 31, and the coordinate values of the respective axes. Also in a machine tool having a rotary axis of a machine structure other than the tool head rotation type, the rotation radiuses of the rotary axes can be calculated.

Figure 3:
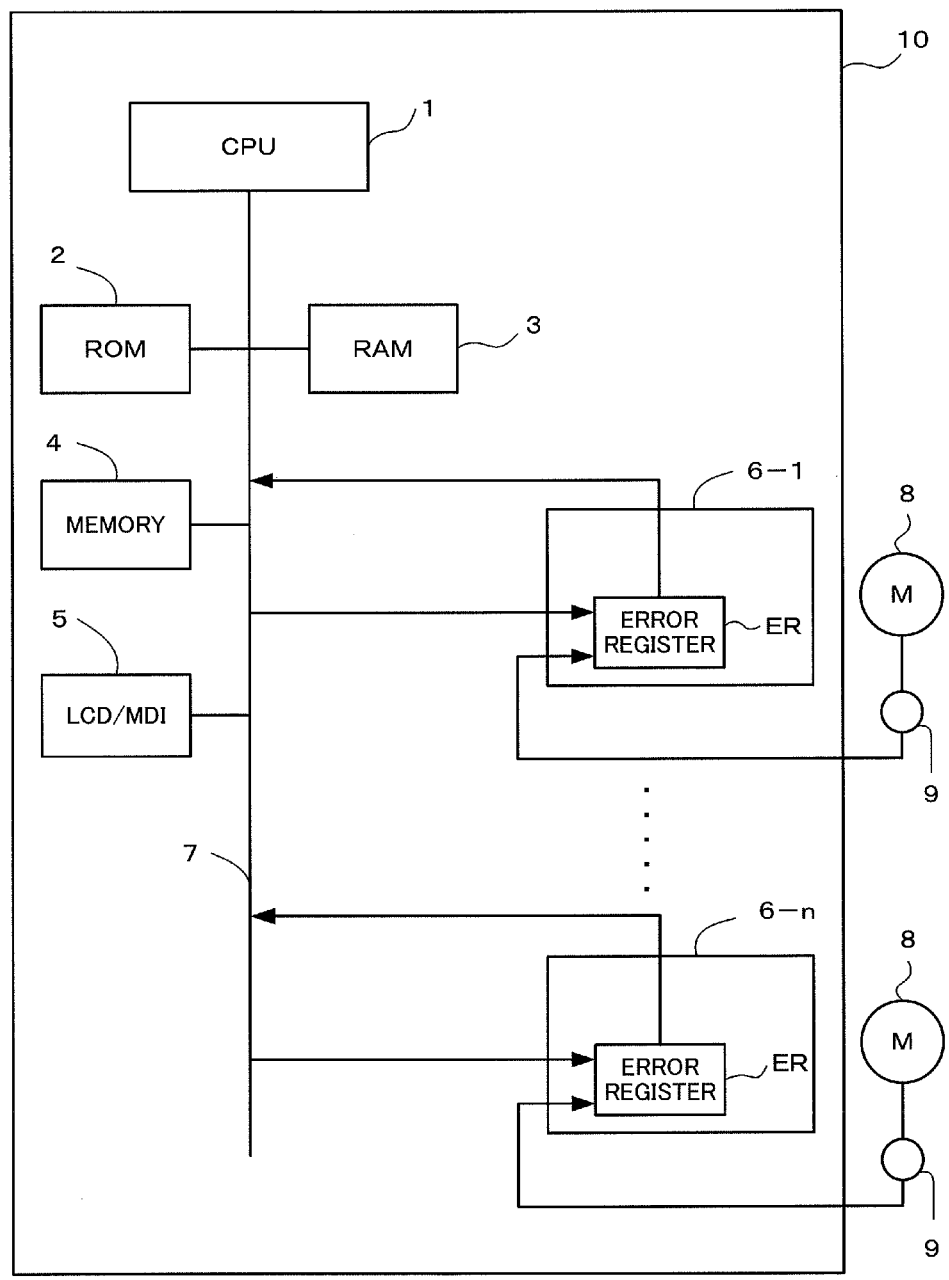
FIG. 3 is a block diagram showing the main part of the numerical controller according to an embodiment of the present invention.

FIG. 3 is a block diagram showing the main part of the numerical controller according to an embodiment of the present invention.

A numerical controller 10 includes a processor 1, and a ROM 2 for storing control programs, a RAM 3 for temporary storage of data, a non-volatile memory 4 for storing various machining programs, an LCD/MDI 5 which is a manual input apparatus with a liquid crystal display device, and servo circuits 6-1 to 6-n for servo motors 8 which drive driving axes of the machine tool, which are connected to the processor 1 through a bus 7.

Each of the servo circuits 6-1 to 6-n includes an error register ER, which stores positional deviations. These error registers ER receive detection position signals from position/speed detection apparatuses 9 attached to the corresponding servo motors 8.

The numerical controller 10, which controls a machine tool, stores in a machining program a path on which the tool advances with respect to the workpiece, and controls the machine tool according to the machining program to perform machining. At this time, the numerical controller 10 reads the machining program on a block-by-block basis and, if the read block includes a movement command such as positioning or cutting, drives the servo motors 8 of the axes according to this command to let the machine tool perform machining such as positioning or cutting.

Then, whether the position specified in the block is reached is determined by checking whether the deviations in the error registers ER in the servo circuits 6-1 to 6-n that drive the servo motors 8 of the respective axes fall within a predetermined range (that is, within the positioning completion value). When the deviations fall within the predetermined range, the process of the next block in the machining program starts. According to the above procedure, the workpiece is machined into a shape specified by the machining program. The numerical controller 10 according to the embodiment of the present invention which controls a machine tool having at least one rotary axis changes the positioning completion width of the rotary axis depending on the rotation radius, so that a positioning completion check at the tool center point can be carried out at a desired precision on the workpiece.

Figure 4:
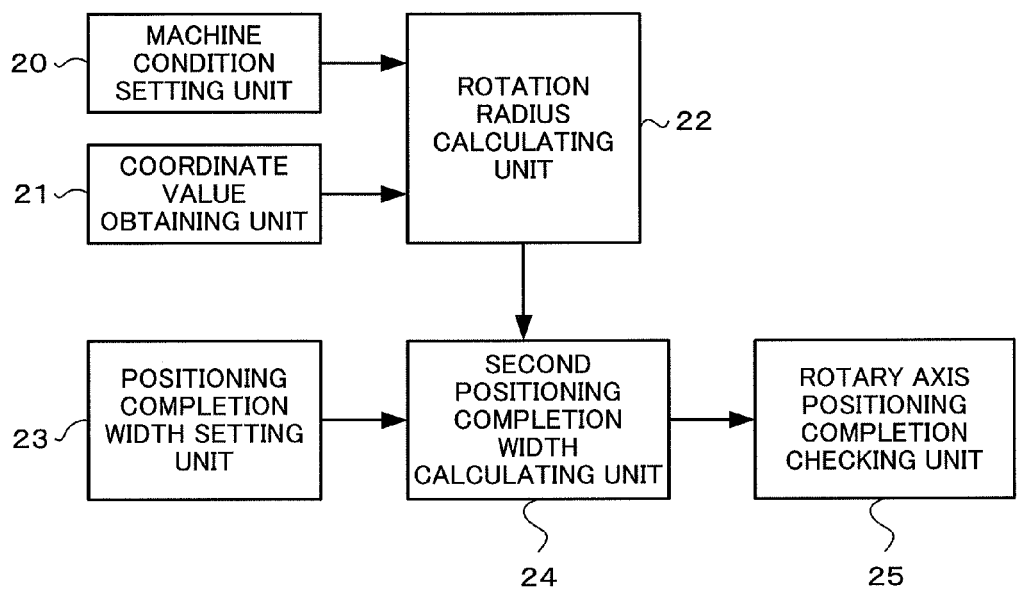
FIG. 4 is a block diagram illustrating elements that carry out a positioning completion check of the rotary axis in the numerical controller shown in FIG. 3.

FIG. 4 is a block diagram illustrating elements that carry out a positioning completion check of the rotary axis in the numerical controller shown in FIG. 3.

The numerical controller includes a machine condition setting unit 20 that sets machine conditions including the axis structure and tool length of the machine tool having at least one rotary axis, a coordinate value obtaining unit 21 that obtains the instructed coordinate values or actual coordinate values of the respective axes at a certain time, a rotation radius calculation unit 22 that calculates the distance (rotation radius) between the rotation center axis of the rotary axis and the control target point using the machine conditions obtained from the machine condition setting unit 20 and the instructed coordinate values or actual coordinate values of the respective axes output from the coordinate value obtaining unit 21, a positioning completion width setting unit 23 that sets the positioning completion widths of the respective axes, a second positioning completion width calculating unit 24 that calculates a second positioning completion width using the rotation radius output from the rotation radius calculation unit 22 and the positioning completion width of the rotary axis obtained from the positioning completion width setting unit 23, and a rotary axis positioning completion checking unit 25 that carries out a positioning completion check using the second positioning completion width output from the second positioning completion width calculating unit 24. The positioning completion width data and machine condition data including the axis structure and tool length may be input from the LCD/MDI 5 shown in FIG. 3 or may be stored in the memory 4 in advance.

Figure 5:
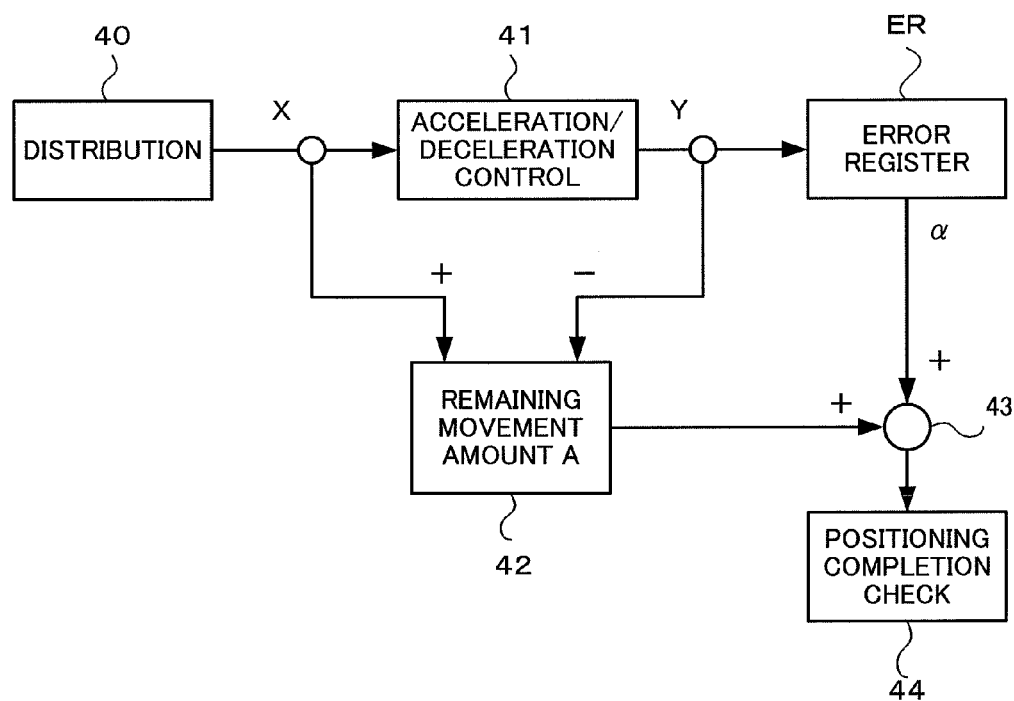
FIG. 5 illustrates a principle of a positioning completion check carried out by the numerical controller shown in FIG. 4.

FIG. 5 illustrates a principle of a positioning completion check to be carried out using the numerical controller shown in FIG. 4.

A distribution control unit 40 of the numerical controller distributes movement commands to the respective axes including a rotary axis, a distributed movement command value X is input to an acceleration/deceleration control unit 41, and the acceleration/deceleration control unit 41 performs acceleration/deceleration control for the movement command. The movement command subjected to acceleration/deceleration control by the acceleration/deceleration control unit 41 is output as a movement command value Y toward the error register ER of the servo circuit (see FIG. 3). A remaining movement amount calculating unit 42 obtains a remaining movement command value A remaining in the acceleration/deceleration control unit 41 by subtracting the movement command value Y output from the acceleration/deceleration control unit 41 from the distributed movement command value X.

Since the error register ER stores a positional deviation amount α, the positional deviation amount α is read from the error register ER, an adding unit 43 adds the read positional deviation amount a to a remaining movement command A remaining in the acceleration/deceleration control unit 41, and a positioning completion checking unit 44 determines whether the sum (A+α) falls within the predetermined second positioning completion width. If the sum (A+α) falls within the predetermined second positioning completion width, the positioning is determined to be completed. As a result, a positioning completion check can be carried out even before acceleration/deceleration control finishes, thereby reducing the cycle time.

Figure 6:
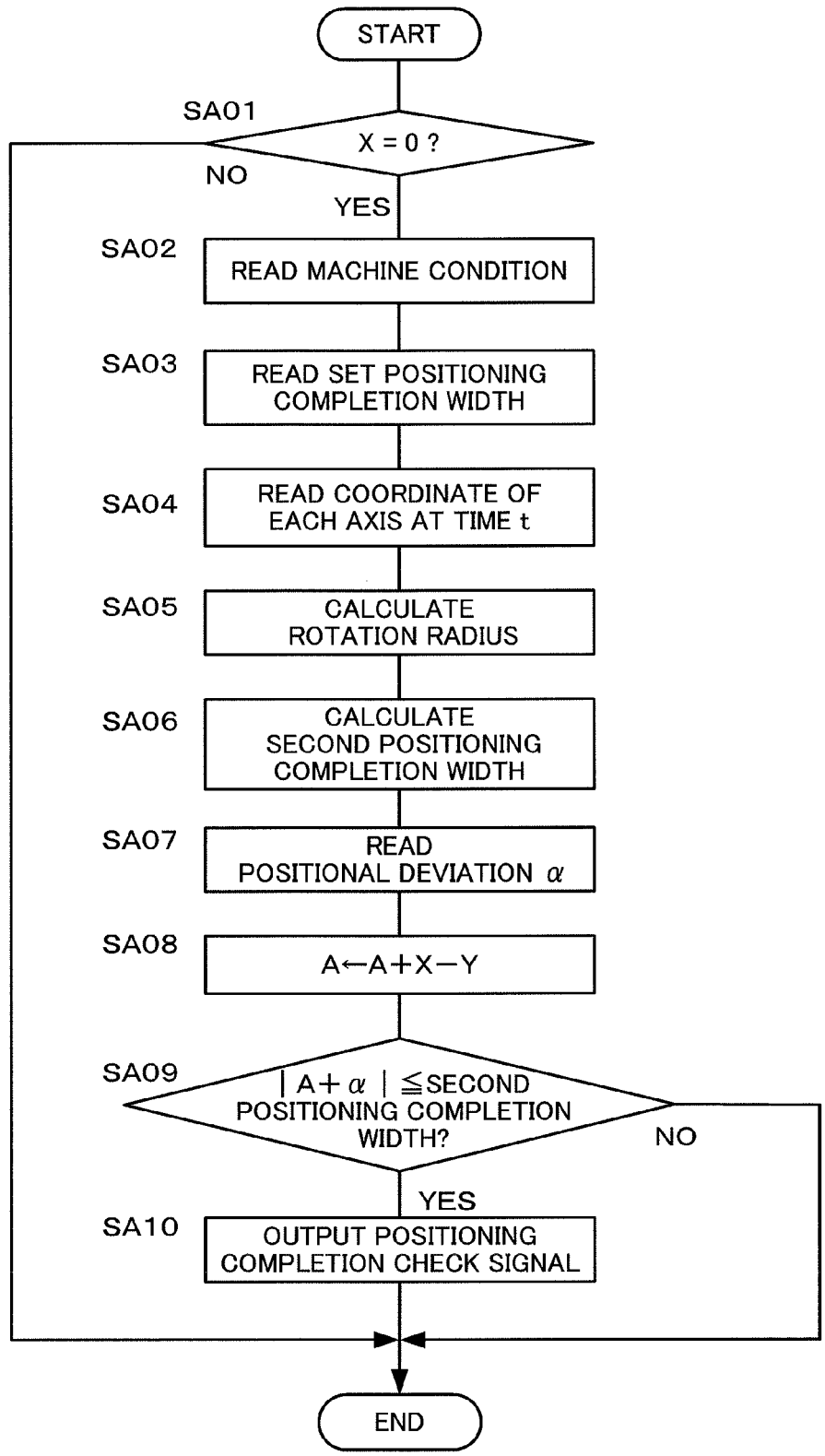
FIG. 6 is a flowchart of an algorithm for the positioning completion check process of a rotary axis carried out by the numerical controller according to the present invention.

FIG. 6 is a flowchart of an algorithm for the positioning completion check process of the rotary axis carried out by the numerical controller according to the present invention. The processor 1 executes the process of the flowchart shown in FIG. 6 in sync with each distribution cycle where a movement command is distributed to each axis. The steps of this process will be described below.

[Step SA01] A decision is made as to whether or not the movement command X distributed and output is 0, and if it is not 0, then the process in the current distribution cycle is finished, whereas if it is 0, then the processing proceeds to step SA02.

[Step SA02] Data of the machine structure of the machine tool controlled by the numerical controller is read from the storage device of the numerical controller. It has been conventionally performed to store data of the machine structure of the machine tool controlled by the numerical controller in the storage device of the numerical controller.

[Step SA03] Data of the positioning completion width that is set and stored in advance in the storage device of the numerical controller is read.

[Step SA04] Data of the current position of each driving axis of the machine tool stored in the register of the numerical controller is read. It has been conventionally performed to store data of the current position of each driving axis of the numerical controller in the register of the numerical controller.

[Step SA05] The rotation radius of the rotary axis to be subjected to a positioning completion check is calculated based on data of the machine structure of the machine tool read in step SA02 and data of the current position of each driving axis of the machine tool read in step SA04.

[Step SA06] The second positioning completion width is calculated using data of the positioning completion width read in step SA03 and data of the rotation radius calculated in step SA05.

[Step SA07] The positional deviation value a is read from each of the error registers ER of the servo circuits of the servo motors 8 that drive the respective axes.

[Step SA08] The value (X−Y) obtained by subtracting, from the movement command value X, the movement command value Y which is output by acceleration/deceleration control to the servo circuit in the current distribution cycle is added to the remaining command value A remaining in the acceleration/deceleration control unit 41, and the calculation result ((X−Y)+A) is stored in the register as the remaining command value A. This register is set to 0 by default.

[Step SA09] A decision is made as to whether or not the absolute value of the sum (A+α) of the positional deviation amount a read from the error register ER and the remaining command value A calculated and stored in register in step SA08 falls within the second positioning completion width calculated in step SA06. If it falls within the second positioning completion width, then the processing proceeds to step SA10, whereas if it does not fall within the second positioning completion width, then the process in the current distribution cycle finishes.

[Step SA10] Since it has been determined that the remaining command value A falls within the second positioning completion width in the process of step SA09, the positioning completion check signal is output. The movement command value in the next block in the machining program starts to be distributed on the basis of the positioning completion check signal.

The numerical controller according to the present invention that carries out the above positioning completion check is not limited to the numerical controller that controls the machine tool of the tool head rotation type shown in FIG. 2. For example, the present invention is applicable to a numerical controller that controls a 5-axis machine tool of the table rotation type.

Figure 7:
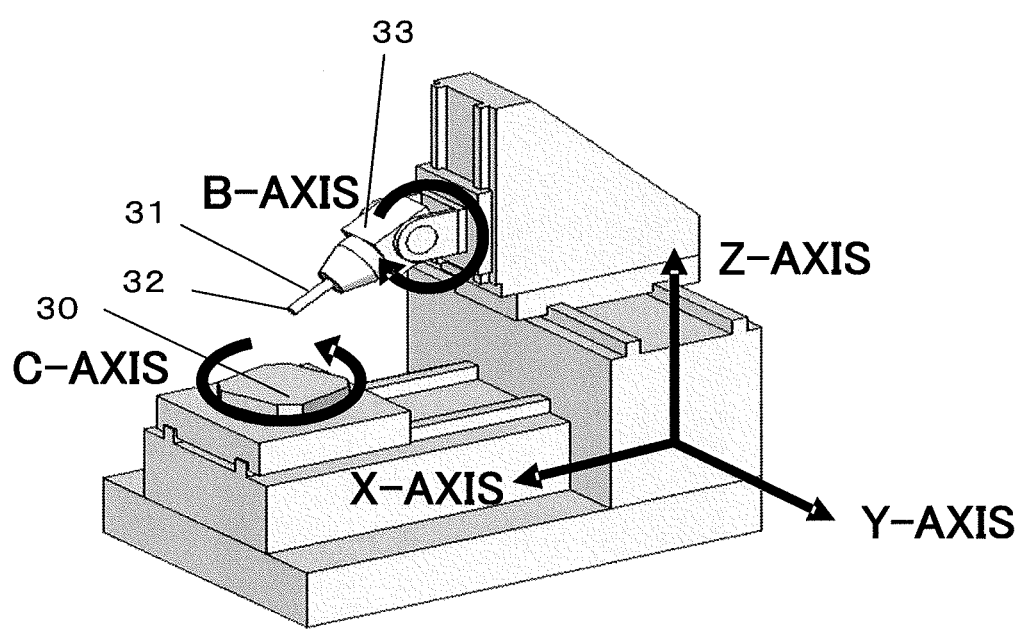
FIG. 7 is a perspective view showing the appearance of an example of the 5-axis machine tool of the table rotation type controlled by the numerical controller according to the present invention.

FIG. 7 is a perspective view showing the appearance of an example of the 5-axis machine tool of the table rotation type controlled by the numerical controller according to the present invention.

In the 5-axis machine tool of the table rotation type shown in FIG. 7, the X-, Y-, and Z-axes are linear axes and the B- and C-axes are rotary axes. The angle of the spindle head section is changed by the rotation of the B-axis and the angle of the table on which the workpiece is placed is changed by the rotation of the C-axis.

First, the rotation radius about the B-axis will be described. For the machine structure of the table rotation type shown in FIG. 7, the rotation radius Rb about the B-axis of the tool center point 32 of the tool 31 is a constant value; if the length of the vertical line from the tool center point 32 to the rotation center axis of the B-axis is assumed to be L, the rotation radius Rb is also L.

Next, the rotation radius Rc about the C-axis will be described. It is assumed that the origin is plotted on the rotation center axis of the C-axis and a coordinate system parallel to the X-, Y-, and Z-axes of the machine is specified as a coordinate system 1. It is also assumed that the coordinate system 1 is fixed in space and does not move even when a table 30 of the C-axis turns. If the vertical line from the tool center point 32 intersects the rotation center axis of the B-axis at point P, the coordinate values of point P change depending on the coordinate values of the X-, Y-, and Z-axes of the machine. If the coordinate values of point P at time t viewed from the coordinate system 1 are (x(t), y(t), z(t)) and the coordinate value of the B-axis is b(t), the coordinate values of the tool center point viewed from the coordinate system 1 are (x(t)+L sin(b(t)), y(t), z(t)−L cos(b(t))). The coordinate value b(t) of the B-axis is assumed to be 0 when the tool faces directly downward. In this case, the rotation radius R about the C-axis of the tool center point is represented by the expression (4) below.

$$Rc = \sqrt{\{(x(t)+L\sin(b(t)))^2 + (y(t))^2\}} \quad (4)$$

Also in the 5-axis machine tool of the table rotation type, the rotation radius R of tool center point with respect to each machining point can be calculated on the basis of machine conditions including the positional relationship between the driving axes and the length of the tool 31, and the coordinate values of the respective axes.

The invention claimed is:

1. A numerical controller that controls a machine tool having at least one rotary axis, the numerical controller comprising:
    a processor;
    a memory coupled to the processor, the memory storing instructions for executing on the processor, the memory comprising:
        a machine condition setting unit configured to set machine conditions including an axis structure and a tool length of the machine tool;
        a coordinate value obtaining unit configured to obtain instructed coordinate values or actual coordinate values of respective axes at a certain time;
        a rotation radius calculating unit configured to calculate a rotation radius that is a distance from a rotation center axis of the rotary axis to a control target point, using the machine conditions obtained from the machine condition setting unit and the instructed coordinate values or the actual coordinate values of the respective axes output from the coordinate value obtaining unit;
        a positioning completion width setting unit configured to set positioning completion widths of the respective axes; and
        a second positioning completion width calculating unit configured to calculate a second positioning completion width using the rotation radius output from the rotation radius calculating unit and the positioning completion width of the rotary axis obtained from the positioning completion width setting unit;
    wherein a positioning completion check of the rotary axis is carried out using the second positioning completion width output from the second positioning completion width calculating unit.

2. The numerical controller according to claim 1, wherein the second positioning completion width calculating unit calculates the second positioning completion width such that the second positioning completion width is inversely proportional to the rotation radius.

3. The numerical controller according to claim 1, wherein the positioning completion width setting unit sets the positioning completion width of the rotary axis as a length along a movement path of the control target point.

4. The numerical controller according to claim 1, wherein the second positioning completion width calculating unit sets an upper limit value or a lower limit value of the second positioning completion width.

5. The numerical controller according to claim 1, wherein the second positioning completion width calculating unit sets an upper limit value or a lower limit value of the rotation radius used for calculation.

\* \* \* \* \*